United States Patent
Watazu et al.

(10) Patent No.: US 10,760,982 B2
(45) Date of Patent: Sep. 1, 2020

(54) PRESSURE DETECTING DEVICE

(71) Applicant: Nissha Co., Ltd., Kyoto-shi, Kyoto (JP)

(72) Inventors: Yuji Watazu, Kyoto (JP); Yosuke Shibata, Kyoto (JP)

(73) Assignee: NISSHA CO., LTD., Kyoto-shi, Kyoto (JP)

(*) Notice: Subject to any disclaimer, the term of this patent is extended or adjusted under 35 U.S.C. 154(b) by 238 days.

(21) Appl. No.: 16/108,555

(22) Filed: Aug. 22, 2018

(65) Prior Publication Data

US 2018/0356299 A1 Dec. 13, 2018

Related U.S. Application Data

(63) Continuation of application No. PCT/JP2016/086324, filed on Dec. 7, 2016.

(30) Foreign Application Priority Data

Feb. 29, 2016 (JP) .................................. 2016-037383

(51) Int. Cl.
  *G01L 1/14* (2006.01)
  *G01L 5/165* (2020.01)
  *G01L 5/16* (2020.01)

(52) U.S. Cl.
  CPC .............. *G01L 1/14* (2013.01); *G01L 1/146* (2013.01); *G01L 5/16* (2013.01); *G01L 5/165* (2013.01)

(58) Field of Classification Search
  CPC . G01L 1/14; G01L 1/142; G01L 1/144; G01L 1/146
  See application file for complete search history.

(56) References Cited

U.S. PATENT DOCUMENTS

| 4,827,763 A | * 5/1989 | Bourland | A61B 5/113 361/283.1 |
| 7,343,813 B1 | 3/2008 | Harrington | |
| 2014/0150572 A1 | 6/2014 | Lim et al. | |

FOREIGN PATENT DOCUMENTS

| JP | 2005-164448 A | 6/2005 |
| JP | 2010-122018 A | 6/2010 |
| JP | 2014-115282 A | 6/2014 |
| JP | 2015-184204 A | 10/2015 |
| WO | 2005/054802 A1 | 6/2005 |

OTHER PUBLICATIONS

International Search Report dated Feb. 28, 2017 for corresponding foreign Application No. PCT/JP2016/086324, 2 pp.

* cited by examiner

*Primary Examiner* — Walter L Lindsay, Jr.
*Assistant Examiner* — Andrew V Do
(74) *Attorney, Agent, or Firm* — United IP Counselors, LLC

(57) ABSTRACT

Each of a first electrode pattern Ty and a second electrode pattern Tx extends between third electrodes Rx neighboring in a Y direction among the plurality of third electrodes Rx so as to overlap only partly with each of the neighboring third electrodes Rx in a plan view. A microcontroller is configured to detect capacitance generated at those portions. The microcontroller is configured to calculate shear force based on a capacitance change obtained due to a change in an overlapping surface area between the third electrode Rx and the first electrode pattern Ty and the second electrode pattern Tx overlapping each other in a plan view, when a pressure is applied so that an insulator is deformed.

11 Claims, 11 Drawing Sheets

PRESSURE DETECTING DEVICE

CROSS-REFERENCE TO RELATED APPLICATIONS

This application is a continuation application of International Application No. PCT/JP2016/086324, filed on Dec. 12, 2016, and claims priority under 35 U.S.C. § 119 to Japanese Patent Application No. 2016-037383, filed on Feb. 29, 2016. The entire disclosures of both applications are hereby incorporated herein by reference in their entireties.

BACKGROUND

Technical Field

The present disclosure relates to a pressure detecting device, particularly to a pressure detecting device capable of detecting shear stress together with stress in a direction perpendicular to an input surface.

Background Information

In recent years, a sensor sheet capable of detecting in-plane pressure distribution is developed and made into a product. For example, there are known a sensor sheet that is laid under the body so as to measure body pressure distribution and a touch pad capable of detecting pressure. However, all of them detect in-plane distribution of stress only in the normal direction to the sheet surface (Z direction).

On the other hand, as a sensor sheet capable of detecting not only stress in the Z direction but also stress in shear directions (X and Y directions), there is a three-component force load cell and the like. However, in order to detect an in-plane distribution, it is necessary to arrange and spread a large number of three-component force load cells, and hence it is difficult to commercialize the device.

JP-A-2014-115282 discloses a tactile sensor in which a plurality of rectangular first electrodes and a plurality of second electrodes are arranged via a dielectric so as to be capable of measuring shear force.

In the tactile sensor of JP-A-2014-115282, rectangular first electrodes 130 and second electrodes 140 are arranged to spread on an upper substrate 110 and a lower substrate 120, respectively. However, the upper substrate 110 can be elastically deformed as a condition, and hence it is technically difficult in reality to form many first electrodes 130 thereon and further to extends wires to a control circuit.

BRIEF SUMMARY

It is an object of the present disclosure to provide a pressure detecting device capable of accurately detecting shear stress together with stress in a direction perpendicular to an input surface.

A pressure detecting device according to one aspect of the present disclosure includes a support substrate, a second insulator having a lower stiffness than the support substrate so as to be elastically deformed by a pressure, and a first insulator. The pressure detecting device includes a plurality of third land-like electrodes, a plurality of first belt-like electrodes, a plurality of second belt-like electrodes, a capacitance measuring circuit, and a pressure calculating unit.

The support substrate, the second insulator, and the first insulator are laminated in order from a side opposite to a pressure input side.

The plurality of third land-like electrodes are arranged to cover an entire surface between the second insulator and the support substrate.

The plurality of first belt-like electrodes extend in a first direction on a side of the first insulator opposite to the second insulator. Each of the first belt-like electrodes extends along spaces between, among the plurality of third land-like electrodes, third land-like electrodes neighboring in a direction crossing the first direction so as to overlap only partly with each of the neighboring third land-like electrodes in a plan view.

The plurality of second belt-like electrodes extends in a second direction crossing the first direction between the first insulator and the second insulator. Each of the second belt-like electrodes extends along spaces between, among the plurality of third land-like electrodes, third land-like electrodes neighboring in a direction crossing the second direction so as to overlap only partly with each of the neighboring third land-like electrodes in a plan view.

The capacitance measuring circuit is configured to detect capacitance generated between each of the third electrodes and the corresponding first belt-like electrode overlapping the third electrode in a plan view. The capacitance measuring circuit is configured to detect capacitance generated between each of the third land-like electrodes and the corresponding second belt-like electrode overlapping the third electrode in a plan view.

The pressure calculating circuit is configured to calculate shear force based on capacitance change detected by the capacitance measuring circuit, due to a change in an overlapping surface area between the third land-like electrodes and the corresponding first belt-like electrodes overlapping each other in a plan view and/or an overlapping surface area between the third land-like electrodes and the corresponding second belt-like electrodes overlapping each other in a plan view, when a pressure is applied so that the second insulator is deformed.

In this device, each of the first belt-like electrodes overlaps a plurality of pairs of third land-like electrodes neighboring in the second direction in a plan view so as to have many intersections. In addition, each of the second belt-like electrodes overlaps a plurality of pairs of third land-like electrodes neighboring in the first direction in a plan view so as to have many intersections.

In this device, when a shear force in the second direction acts on the first belt-like electrode, at portions of the first belt-like electrode on which the shear force acts, areas of intersections with a pair of third land-like electrodes neighboring the first belt-like electrode (overlapping portions of the first belt-like electrode with a corresponding pair of the third land-like electrodes in a plan view) are changed. In this way, the capacitance between the first belt-like electrode and one third electrode is increased, while the capacitance between the first belt-like electrode and the other third electrode is decreased. And, the capacitance measuring circuit detects capacitance change at those portions, and then the pressure calculating circuit calculates shear force based on the capacitance change.

The pressure detecting device can further include a plurality of switching elements, a plurality of read lines, a plurality of control lines, and a switching control unit.

The plurality of switching elements are connected to the plurality of third land-like electrodes, respectively.

Each of the plurality of read lines is connected to a plurality of switching elements arranged in the first direction or the second direction among the plurality of switching elements. Each of the read lines extends in the arrangement direction of the plurality of switching elements so as to be connected to the capacitance measuring circuit.

The plurality of control lines extend in a direction crossing the arrangement direction so as to be connected to the plurality of switching elements arranged in that direction.

The switching control unit is configured to perform on-off control of the plurality of switching elements via the plurality of control lines.

In this device, in the state where the gate driving circuit turns on the plurality of switching elements via one control line, the capacitance measuring circuit detects the plurality of read lines in turn, so as to detect a change in capacitance at intersections between the third land-like electrodes and the first belt-like electrodes or the second belt-like electrodes.

In this device, since the read lines are connected to the plurality of third land-like electrodes via the plurality of switching elements, the number of read lines can be reduced. As a result, in a structure where many third land-like electrodes are arranged, the read lines can be arranged with no problem.

An elastic modulus of the second insulator can be 0.001 to 10 MPa. In this device, the second insulator is sufficiently soft, the second insulator can be deformed by a pressure so that the first belt-like electrodes and the second belt-like electrodes can move in a direction in which they approach the third land-like electrodes and in a surface direction.

The first insulator can be thinner than the second insulator. In this device, the distance between the first belt-like electrodes and the second belt-like electrodes is set to be small. Therefore, when the first belt-like electrodes and the second belt-like electrodes are displaced relative to the third land-like electrodes, the displacement of the first belt-like electrodes from the third land-like electrodes is not so different from the displacement of the second belt-like electrodes from the third land-like electrodes. As a result, the capacitance can be accurately measured.

BRIEF DESCRIPTION OF THE DRAWINGS

Referring now to the attached drawings which form a part of this original disclosure.

DETAILED DESCRIPTION OF THE EMBODIMENTS

1. First Embodiment (1) Overall Structure of Touch Pad Device

Figure 1:
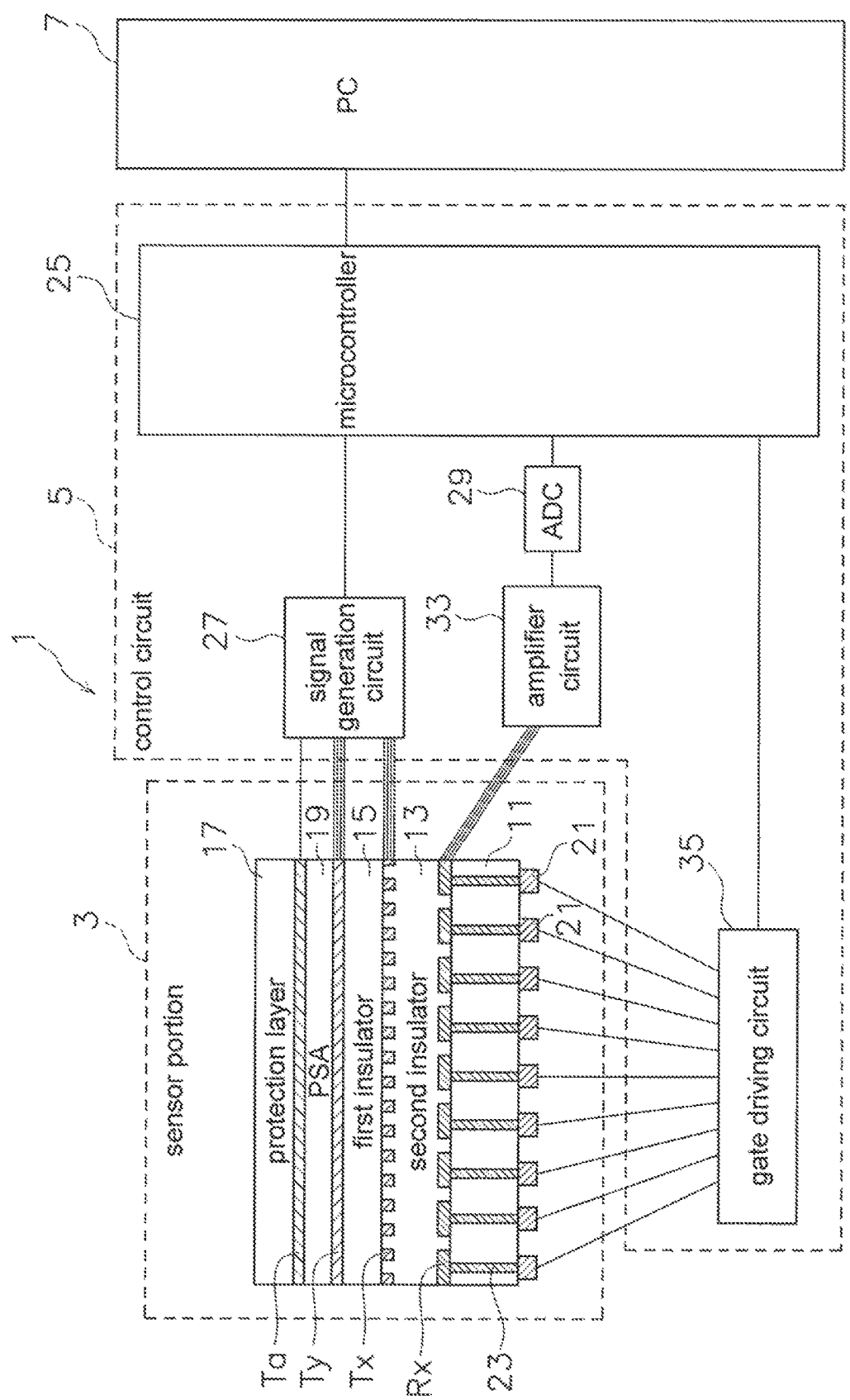
FIG. 1 is a block structural diagram of a touch pad device.

With reference to FIG. 1, an overall structure of a touch pad device 1 (one example of a pressure detecting device) is described. FIG. 1 is a block structural diagram of the touch pad device.

The touch pad device 1 includes a sensor portion 3 (touch pad) and a control circuit 5.

The sensor portion 3 has a function of detecting a position applied with pressure and a function of detecting the pressure.

The control circuit 5 controls the sensor portion 3 and performs various measurements based on a detection signal from the sensor portion 3.

Note that the touch pad device 1 includes a PC 7. The PC 7 is, for example, a personal computer. Using the PC 7, various data and instructions can be input to the control circuit 5, and further information from the control circuit 5 can be displayed on a monitor screen. For example, data of mutual capacitance as a result of measurement described later is displayed on a monitor of the PC 7.

(2) Structure of Sensor Portion

The sensor portion 3 includes a support substrate 11, a second insulator 13, and a first insulator 15, which are laminated in order from a side opposite to an input side of the pressure. Specifically, the second insulator 13 is disposed on the upper surface of the support substrate 11. The first insulator 15 is disposed on the upper surface of the second insulator 13.

The support substrate 11 is a glass epoxy substrate, for example, having a thickness of 1.6 mm. Note that material of the support substrate 11 is not particularly limited.

The second insulator 13 is a member capable of being elastically deformed when a force is applied. An elastic modulus of the second insulator 13 is preferably in a range of 0.001 to 10 MPa and is more preferably in a range of 0.001 to 0.01 MPa. The second insulator 13 is a polyurethane gel sheet, for example, having a thickness of 1 mm. The polyurethane gel sheet preferably has a hardness of 0 so as to be deformed sufficiently even by a light load. Further, since the polyurethane gel sheet has stickiness, it can glue the support substrate 11 and the first insulator 15 without using additional adhesive or the like. Note that the material of the second insulator 13 is not particularly limited.

A thickness of the second insulator 13 is preferably in a range of 10 μm to 10,000 μm and is more preferably in a range of 100 μm to 2,000 μm.

The first insulator 15 is a layer for insulating between a first electrode pattern Ty and a second electrode pattern Tx and for arranging them with a predetermined distance between them in a lamination direction.

The first insulator 15 is a urethane film, for example, having a thickness of 0.07 mm.

An elastic modulus of the first insulator 15 is preferably in a range of 1 MPa to 4,000 MPa and is more preferably in a range of 1 MPa to 10 MPa.

Note that the material of the first insulator 15 is not particularly limited.

A thickness of the first insulator 15 is preferably in a range of 1 μm to 1,000 μm and is more preferably in a range of 10 μm to 100 μm.

The first electrode pattern Ty and the second electrode pattern Tx are constituted of a plurality of strip-like or belt-like first electrodes Ty and second electrodes Tx, respectively.

Figure 2:
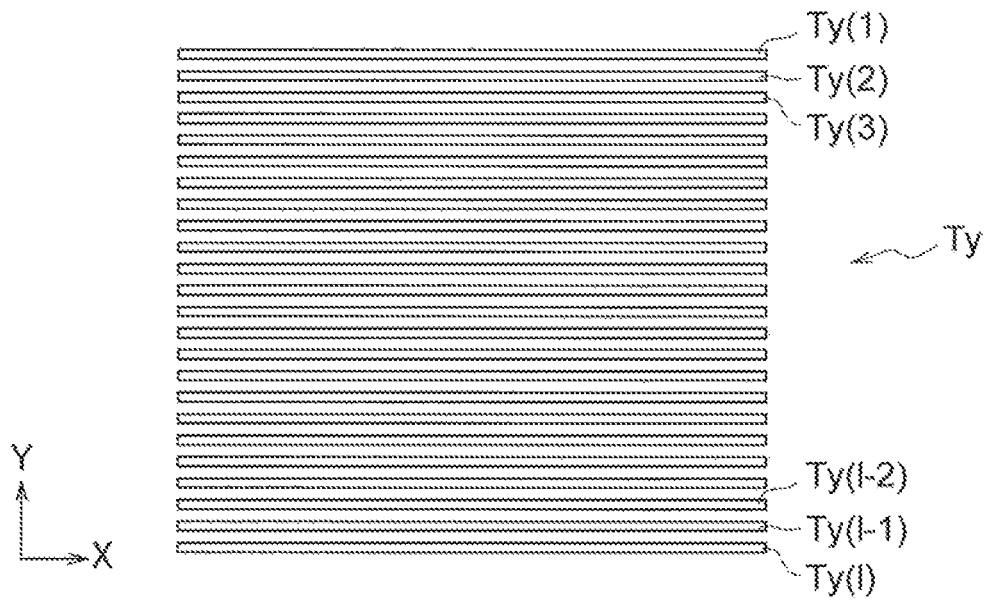
FIG. 2 is a plan view of a first electrode pattern.

The first electrode pattern Ty is formed on the upper surface of the first insulator 15, i.e. on a side of the first electrode pattern the opposite to the second insulator 13. As shown in FIG. 2, the first electrode pattern Ty is arranged in a Y direction and extends in an X direction (one example of a first direction). The first electrode pattern Ty includes a plurality of first electrodes Ty(1), Ty(2), Ty(3), . . . Ty(l−2), Ty(l−1), and Ty(l) extending in the X direction. FIG. 2 is a plan view of the first electrode pattern.

Figure 3:
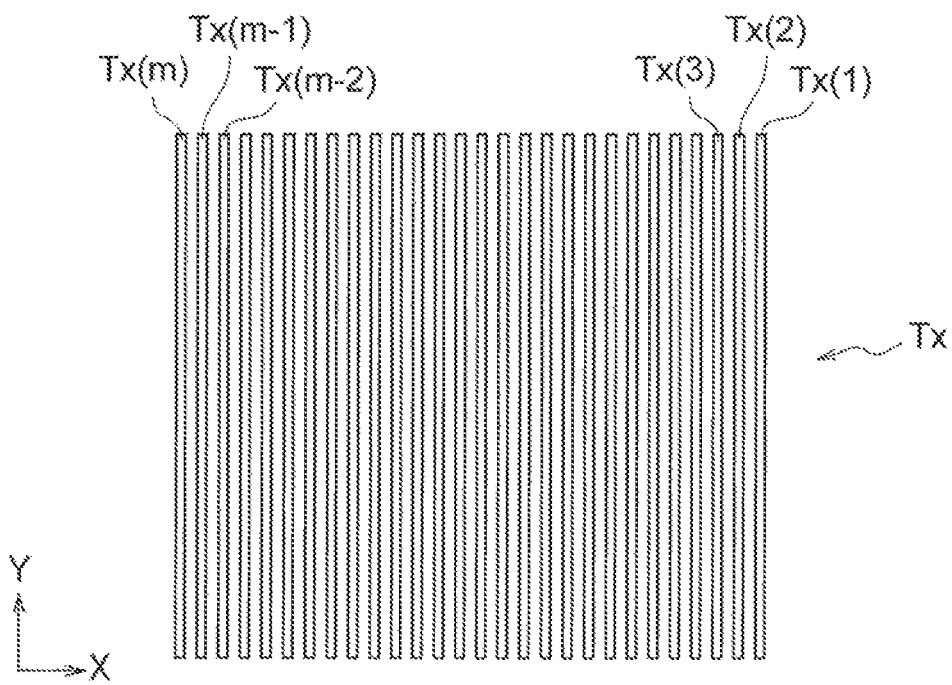
FIG. 3 is a plan view of a second electrode pattern.

The second electrode pattern Tx is formed on the lower surface of the first insulator 15, i.e. between the first insulator 15 and the second insulator 13. As shown in FIG. 3, the second electrode pattern Tx is arranged in the X direction and extends in the Y direction (one example of a second direction). The second electrode pattern Tx includes a plurality of second electrodes Tx(1), Tx(2), Tx(3), . . . Tx(m−2), Tx(m−1), and Tx(m) extending in the Y direction. FIG. 3 is a plan view of the second electrode pattern.

With the structure described above, the second electrode pattern Tx secures insulation to the first electrode pattern Ty and is disposed to cross the first electrode pattern Ty (perpendicularly in this embodiment). The first electrode pattern Ty and the second electrode pattern Tx are led out to connection terminals (not shown) by lead wires.

Figure 4:
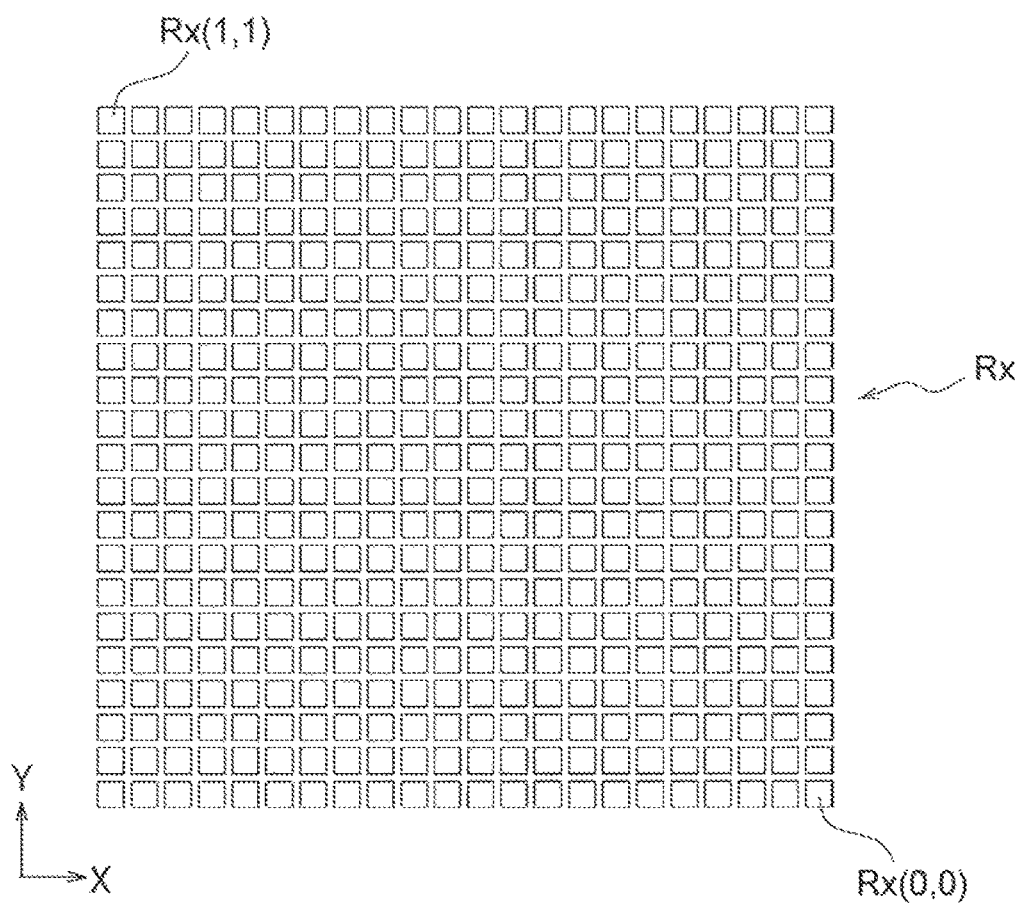
FIG. 4 is a plan view of a third electrode pattern.

A third electrode pattern Rx (one example of a plurality of electrodes arranged to spread on the entire surface between the second insulator and the support substrate) is formed between the second insulator 13 and the support substrate 11. As shown in FIG. 4, the third electrode pattern Rx is constituted of many land-like third electrodes Rx arranged to spread on the entire surface. FIG. 4 is a plan view of the third electrode pattern.

The third electrode pattern Rx constitutes a matrix of the third electrodes Rx(1, 1) to Rx(n, o). In this embodiment, each of the third electrodes Rx has a square shape. As described later, the first electrodes Ty and the second electrodes Tx are disposed so as to cover gaps between neighboring third electrodes Rx. In other words, the first electrode Ty and the second electrode Tx have widths larger than the gap between the third electrodes Rx. The shape of the third electrode Rx can be other shapes.

The first electrode pattern Ty, the second electrode pattern Tx, and the third electrode pattern Rx are preferably made of material having a surface resistance (conductivity) of a few mΩ to a few hundred Ω, and can be film-formed using, for example, metal oxide such as indium oxide, tin oxide, indium tin oxide (ITO), or tin antimony oxide, or metal such as gold, silver, copper, platinum, palladium, aluminum, or rhodium. As a method of forming the first electrode pattern Ty and the second electrode pattern Tx using the above-mentioned material, there are a PVD method such as a spattering method, a vacuum deposition method, and an ion plating method, a CVD method, a method of patterning by etching after forming a transparent conductive film by a coating method or the like, a printing method, and the like.

In the structure described above, the second insulator 13 as an elastic body capable of being deformed by stress from the input surface is disposed between the second electrode pattern Tx and the third electrode pattern Rx. Therefore, by the stress from the input surface, the second electrode pattern Tx and the first electrode pattern Ty can be displaced from the third electrode pattern Rx.

Note that the second electrode Tx, the first electrode Ty, and the first insulator 15 are also required to have certain flexibility. It is because when PET film or the like having high stiffness is laminated, the stiffness prevents the second insulator 13 from being elastically deformed.

The sensor portion 3 includes a protection layer 17. The upper surface of the protection layer 17 is the input surface on which a finger touches. The protection layer 17 is a layer for protecting the electrode pattern described above and has functions of preventing the finger from conducting to the electrode pattern and preventing the electrode pattern from being damaged. The protection layer 17 is a urethane film, for example, having a thickness of 0.05 mm. Note that the protection layer 17 is an arbitrary member and can be eliminated.

A fourth electrode pattern Ta is formed on the lower surface of the protection layer 17. The fourth electrode pattern Ta is a solid pattern that entirely covers the first electrode pattern Ty, the second electrode pattern Tx, and the third electrode pattern Rx. The fourth electrode pattern Ta is also an arbitrary member. In addition, the fourth electrode pattern Ta can be formed between the first electrodes Ty on the same surface as the first electrode pattern Ty, because it is sufficient that the fourth electrode pattern Ta can cover the third electrode pattern Rx.

The protection layer 17 and the first insulator 15 are fixed to each other with a PSA 19 as an insulating layer.

The first insulator 15 has a thickness smaller than that of the second insulator 13. The first insulator 15 preferably has a thickness in a range of 20% or less of the thickness of the second insulator 13 and more preferably has a thickness in a range of 10% or less of the same. For example, if the second insulator 13 has a thickness of 1 mm, the first insulator 15 has a thickness of 0.07 mm. In this device, because the second insulator 13 is set to be thin, the distance between the first electrode pattern Ty and the second electrode pattern Tx is set to be small. Therefore, when the first electrode pattern Ty and the second electrode pattern Tx are displaced from the third electrode Rx, the displacement of the first electrode pattern Ty from the third electrode Rx is not so different from the displacement of the second electrode pattern Tx from the third electrode Rx.

(3) Principle of Detecting Shear Stress

Figure 5:
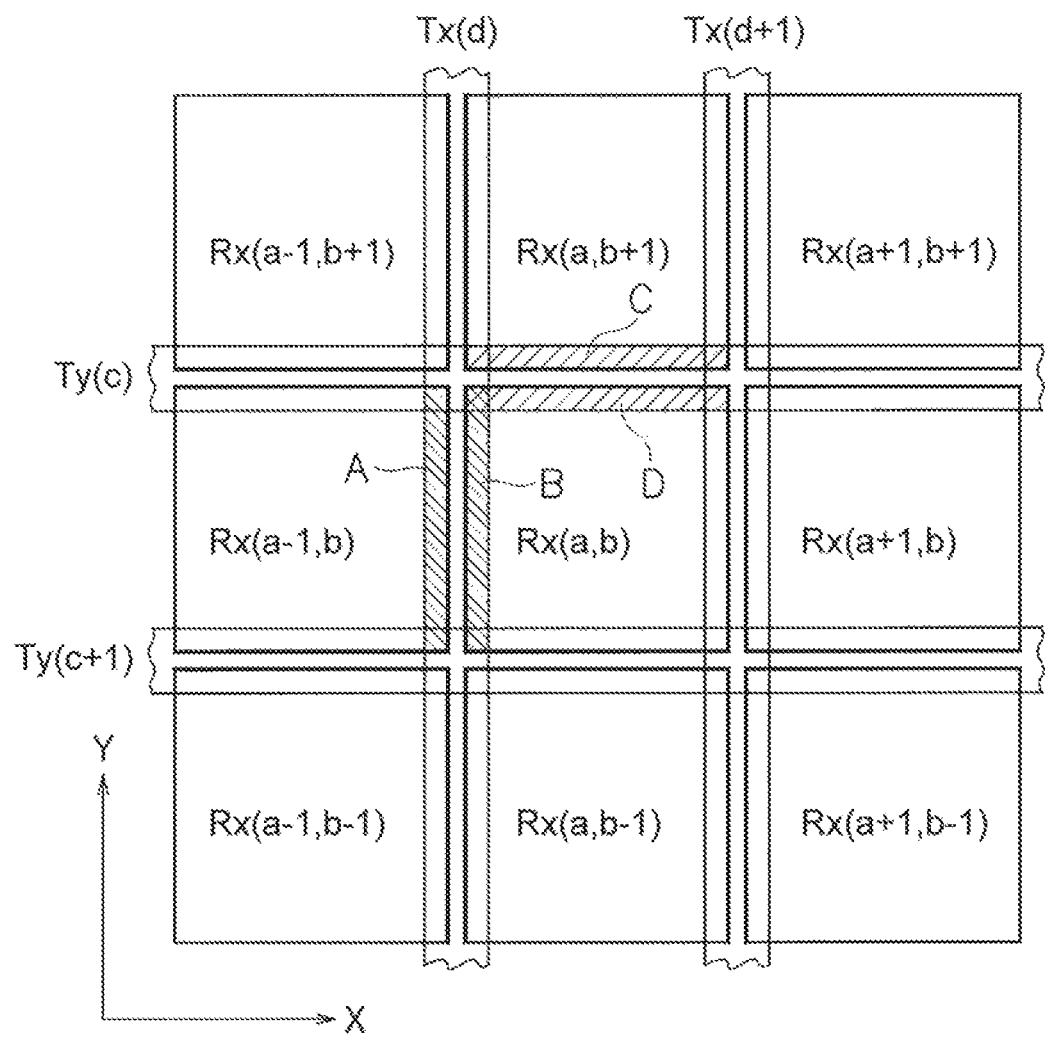
FIG. 5 is a plan view showing an overlapping state of the electrode patterns.
Figure 6:
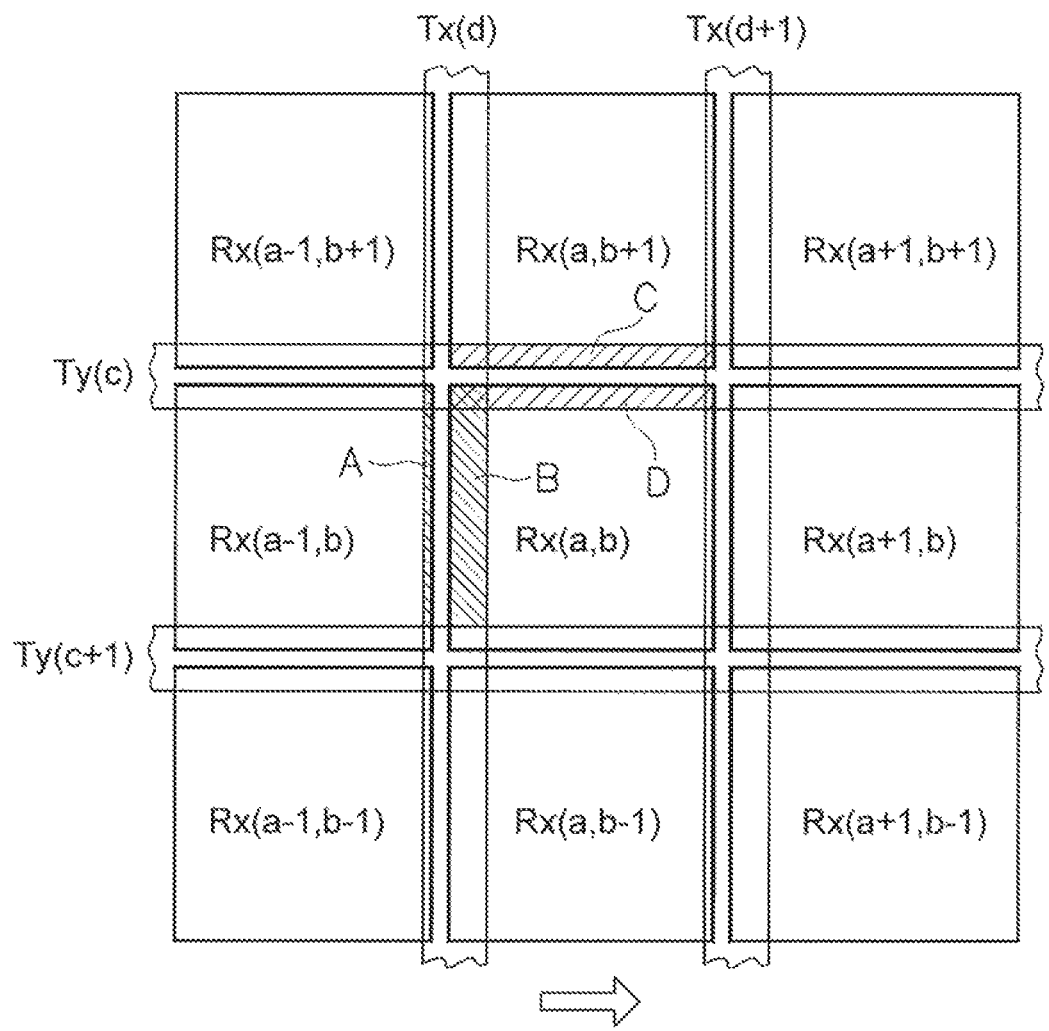
FIG. 6 is a plan view showing a change in the overlapping state of the electrode patterns when a shear force acts.
Figure 7:
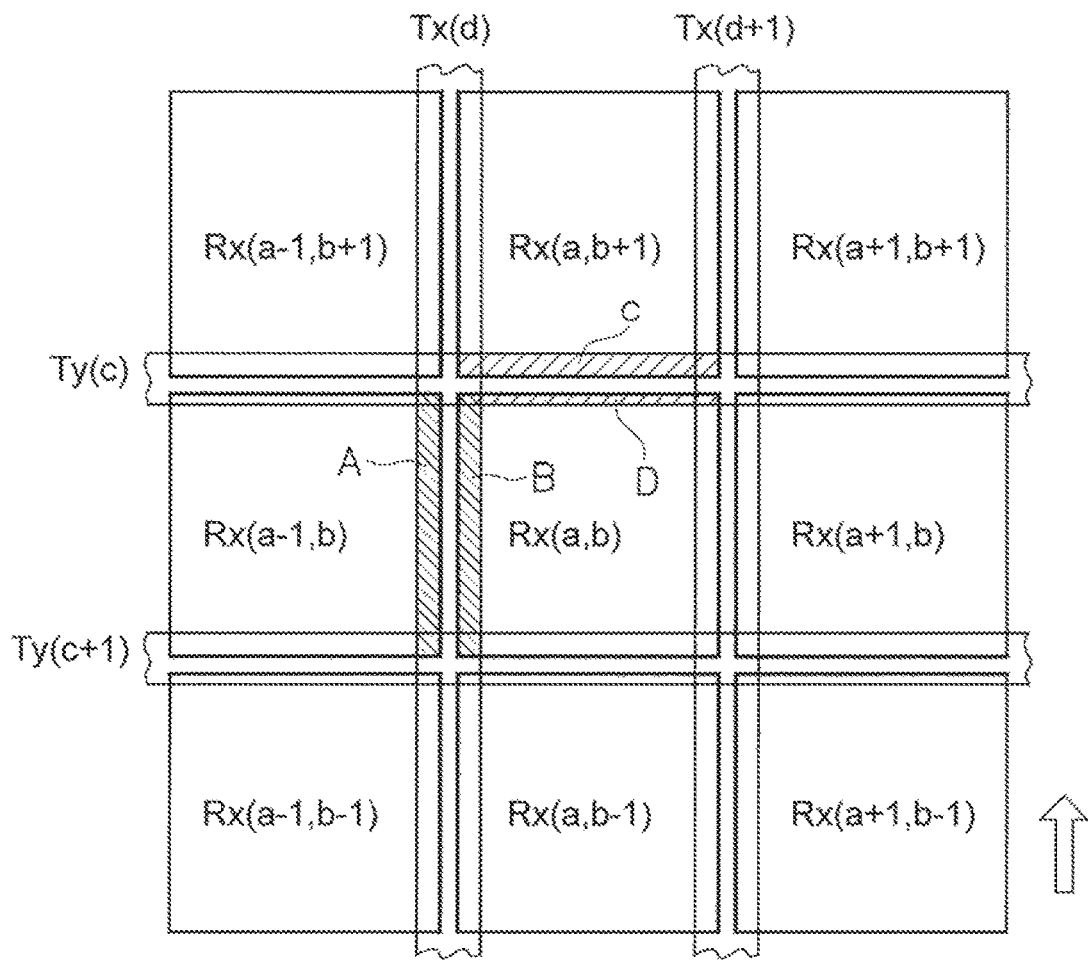
FIG. 7 is a plan view showing a change in the overlapping state of the electrode patterns when a shear force acts.

With reference to FIGS. 5 to 7, a change in an electrode position when the input surface receives a stress in a shear direction, and a principle of detection thereof are described in a qualitative manner. FIG. 5 is a plan view showing an overlapping state of the electrode patterns. FIGS. 6 and 7 are plan views showing changes in the overlapping state of the electrode patterns when a shear force acts.

Each of the plurality of first electrodes Ty extends along spaces between the third electrodes Rx neighboring in the Y direction among the plurality of third electrodes Rx, so as to overlap only partly with each of the neighboring third electrodes Rx in a plan view.

Each of the plurality of second electrodes Tx extends along spaces between the third electrodes Rx neighboring in the X direction among the plurality of third electrodes Rx, so as to overlap only partly with each of the neighboring third electrodes Rx in a plan view.

As described above, each of the first electrodes Ty overlaps a plurality of pairs of third electrodes Rx neighboring in the Y direction in a plan view so as to have many intersections. In addition, each of the second electrodes Tx overlaps a plurality of pairs of third electrodes Rx neighboring in the X direction in a plan view so as to have many intersections.

With reference to FIG. 5, in the third electrode pattern Rx, the third electrode Rx(a−1, b+1) to the third electrode Rx(a+1, b−1) (a, b are arbitrary natural numbers), and the second electrode Tx(d), the second electrode Tx(d+1), the first electrode Ty(c), and the first electrode Ty(c+1) overlapping with them are considered. FIG. 5 shows overlaps of the first electrode Ty, the second electrode Tx, and the third electrode Rx in a state without a stress. Each of the second electrodes Tx and the first electrodes Ty overlaps with third electrodes Rx and has mutual capacitances substantially proportional to the overlapping areas.

Hereinafter, the following mutual capacitances of four overlaps A to D shown with hatching are examined:

the mutual capacitance of the overlap A between Rx(a−1, b) and Tx(d);

the mutual capacitance of the overlap B between Rx(a, b) and Tx(d);

the mutual capacitance of the overlap C between Rx(a, b+1) and Ty(c) and the mutual capacitance of the overlap D between Rx(a, b) and Ty(c).

Further, mutual capacitances of the overlaps A to D are expressed by the following expressions:

mutual capacitance of the overlap A is C[Rx(a−1, b)/Tx(d)], mutual capacitance of the overlap B is C[Rx(a, b)/Tx(d)]

mutual capacitance of the overlap C is C[Rx(a, b+1)/Ty(c)], and mutual capacitance of the overlap D is C[Rx(a, b)/Ty(c)].

As shown in FIG. 6, when the input surface receives a stress in the +X direction, the second electrode Tx and the first electrode Ty are moved in the +X direction with respect to the third electrode Rx, and the overlapping surface areas thereof are changed according to the movements. Specifically, the mutual capacitance C[Rx(a, b)/Tx(d)] of the overlap B is increased, while the mutual capacitance C[Rx(a−1, b)/Tx(d)] of the overlap A is decreased. On the other hand, the mutual capacitance C[Rx(a, b+1)/Ty(c)] of the overlap C and the mutual capacitance C[Rx(a, b)/Ty(c)] of the overlap D are not changed.

As shown in FIG. 7, when the input surface receives a stress in the +Y direction, the second electrode Tx and the first electrode Ty are moved in the +Y direction with respect to the third electrode Rx, and the overlapping surface areas thereof are changed according to the movements. Specifically, the mutual capacitance C[Rx(a, b+1)/Ty(c)] of the overlap C is increased, while the mutual capacitance C[Rx(a, b)/Ty(c)] of the overlap D is decreased.

As described above, measuring the capacitances of the four overlaps A to D described above allows the movements of electrodes in the X direction and in the Y direction to be detected, thereby detecting the shear stress.

(4) Relationship Among Mutual Capacitance, Shear Stress, and Normal Direction Stress Next, a relationship among the mutual capacitance between the third electrode Rx and the second electrode Tx or the first electrode Ty, the shear stress, and the stress in the normal direction (Z direction) is quantitatively analyzed. In order to consider the X direction, FIGS. 8 to 11 show cross-sectional views of positional relationships among the second electrode Tx(d), the third electrode Rx(a−1, b), and the third electrode Rx(a, b). FIGS. 8 to 11 are schematic cross-sectional views showing relationships among the mutual capacitance, the shear stress, and the stress in the normal direction.

Note that the stress in the Y direction can be similarly detected using the mutual capacitance C[Rx(a, b)/Ty(c)] of the overlap D and the mutual capacitance C[Rx(a, b+1)/Ty(c)] of the overlap C, and hence description thereof is omitted.

Figure 8:
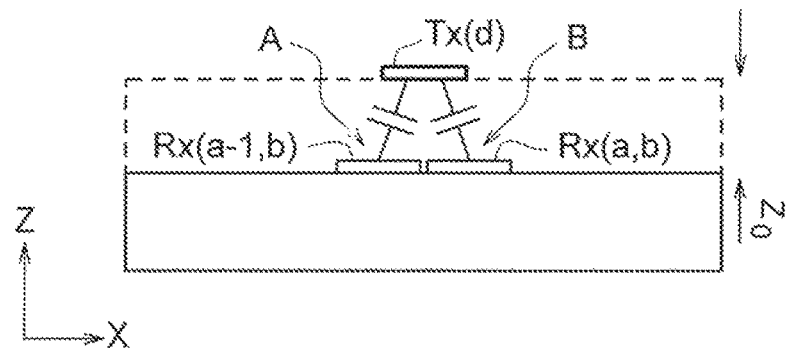
FIG. 8 is a schematic cross-sectional view showing a relationship among a mutual capacitance, a shear stress, and a stress in the normal direction.

FIG. 8 shows a situation where a stress is not applied. In this situation, the distance between the second electrode Tx(d) and the plane of the third electrode Rx(a−1, b) or the third electrode Rx(a, b) in the normal direction is represented by $z_0$, and then the mutual capacitances are expressed as the following equations in Mathematical 1.

$$C[Rx(a, b)/Tx(d)]_0 = \frac{K_1}{z_0} \quad \text{[Mathematical 1]}$$

$$C[Rx(a-1, b)/Tx(d)]_0 = \frac{K_2}{z_0}$$

Here, K1 and K2 are constants of proportionality depending on a dielectric constant and a thickness of the second insulator 13, size of each of the electrode patterns, positions in the X direction and in the Y direction, and the like.

Figure 9:
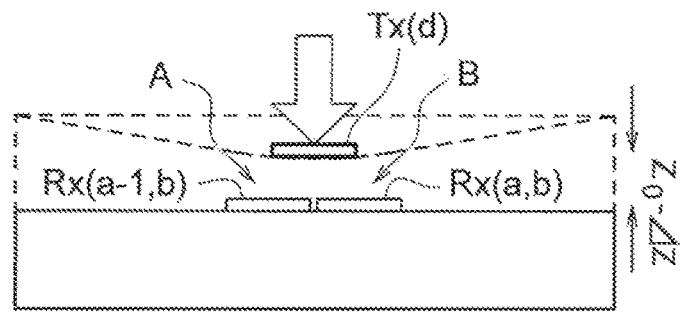
FIG. 9 is a schematic cross-sectional view showing a relationship among the mutual capacitance, the shear stress, and the stress in the normal direction.

As shown in FIG. 9 when being pressed in the −Z direction, the second electrode Tx(d) approaches the third electrode Rx(a−1, b) and the third electrode Rx(a, b) in accordance with the pressure. In other words, the distance changes from $z_0$ to $z_0-\Delta z$. In this case, the mutual capacitance C[Rx(a, b)/Tx(d)]z of the overlap B and the mutual capacitance C[Rx(a−1, b)/Tx(d)]z of the overlap A are changed according to $\Delta z$ as the following equations in Mathematical 2.

$$C[Rx(a, b)/Tx(d)]_z = \frac{K_1}{z_0 - \Delta z} \quad \text{[Mathematical 2]}$$

$$C[Rx(a-1, b)/Tx(d)]_z = \frac{K_2}{z_0 - \Delta z}$$

Satisfying the equations in Mathematical 1 and Mathematical 2 simultaneously, $\Delta z$ is expressed as the following equation in Mathematical 3.

$$\Delta z = K_1 \left( \frac{1}{C[Rx(a, b)/Tx(d)]_0} - \frac{1}{C[Rx(a, b)/Tx(d)]_z} \right) \quad \text{[Mathematical 3]}$$

$$= K_2 \left( \frac{1}{C[Rx(a-1, b)/Tx(d)]_0} - \frac{1}{C[Rx(a-1, b)/Tx(d)]_z} \right)$$

When the elastic body is deformed in its elastic region, $\Delta z$ is proportional to the stress, and hence the stress in the −Z direction can be detected from a change in capacitance using the equation in Mathematical 3.

Figure 10:
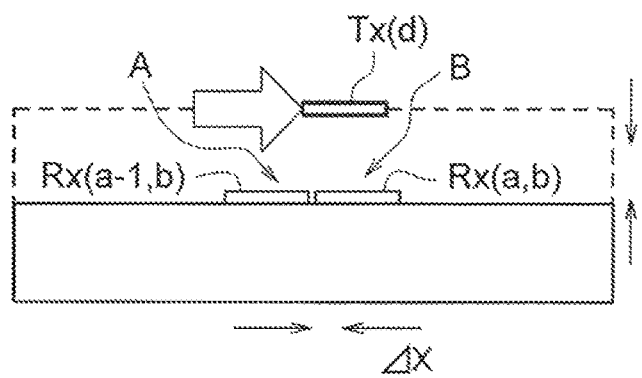
FIG. 10 is a schematic cross-sectional view showing a relationship among the mutual capacitance, the shear stress, and the stress in the normal direction.

Next, as shown in FIG. 10, a case where a pressure in the +X direction (shear stress) is generated is considered. In that case, the second electrode Tx is moved according to the pressure. In this case, the mutual capacitance C[Rx(a, b)/Tx(d)]x of the overlap B and the mutual capacitance C[Rx(a−1, b)/Tx(d)]x of the overlap A are changed according to Δx as the following equations in Mathematical 4.

$$C[Rx(a, b)/Tx(d)]_x = \frac{K_1}{z_0} + \frac{K_p}{z_0}\Delta x \qquad \text{[Mathematical 4]}$$

$$C[Rx(a-1, b)/Tx(d)]_x = \frac{K_2}{z_0} - \frac{K_p}{z_0}\Delta x$$

Here, $K_p$ has a value proportional to the length of the hatching portion in FIG. 5. From the equations in Mathematical 1 and Mathematical 4, Δx can be expressed as the following equation in Mathematical 5.

$$\Delta x = \frac{z_0}{K_p}(C[Rx(a, b)/Tx(d)]_x - C[Rx(a, b)/Tx(d)]_z) = \qquad \text{[Mathematical 5]}$$

$$\frac{z_0}{K_p}(C[Rx(a, b)/Tx(d)]_x + C[Rx(a, b)/Tx(d)]_z)$$

When the second insulator 13 is deformed in its elastic region, Δx is proportional to the stress, and hence the stress in the +X direction can be detected from a change in capacitance using the equation in Mathematical 5.

Figure 11:
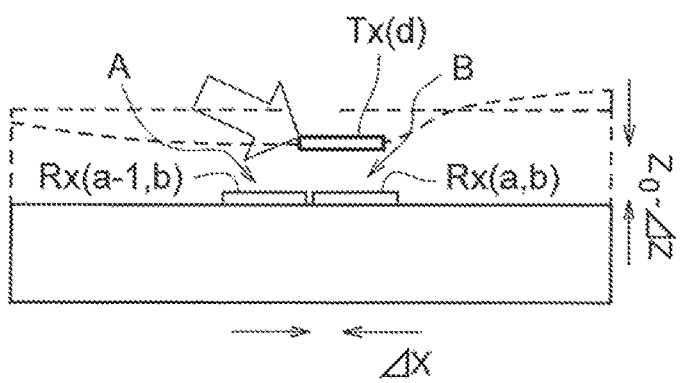
FIG. 11 is a schematic cross-sectional view showing a relationship among the mutual capacitance, the shear stress, and the stress in the normal direction.

Finally, as shown in FIG. 11, a case where a pressure in the +X direction and a pressure in the −Z direction are simultaneously applied is considered. In this case, it is considered that the second electrode Tx(d) is moved in the Z direction by Δz and is further moved in the X direction by Δx. C[Rx(a, b)/Tx(d)]zx and C[Rx(a−1, b)/Tx(d)]zx can be calculated by replacing $Z_0$ in the equation in Mathematical 4 with Z−Δz, and hence they can be expressed as the following equations in Mathematical 6.

$$C[Rx(a, b)/Tx(d)]_{zx} = \frac{K_1}{z_0 - \Delta z} + \frac{K_p}{z_0 - \Delta_z}\Delta x \qquad \text{[Mathematical 6]}$$

$$C[Rx(a-1, b)/Tx(d)]_{zx} = \frac{K_2}{z_0 - \Delta z} - \frac{K_p}{z_0 - \Delta z}\Delta x$$

From the equations in Mathematical 6 and Mathematical 1, the following equations in Mathematical 7 can be obtained.

$$\Delta z = (K_1 + K_2)\left(\frac{1}{C[Rx(a, b)/Tx(d)]_0 + C[Rx(a-1, b)/Tx(d)]_0} - \frac{1}{C[Rx(a, b)/Tx(d)]_{zx} + C[Rx(a-1, b)/Tx(d)]_{zx}}\right) \qquad \text{[Mathematical 7]}$$

$$\Delta x = \frac{K_1 + K_2}{2K_p}\frac{C[Rx(a, b)/Tx(d)]_{zx} - C[Rx(a-1, b)/Tx(d)]_{zx}}{C[Rx(a, b)/Tx(d)]_{zx} + C[Rx(a-1, b)/Tx(d)]_{zx}}$$

From above discussion, Δz is proportional to the following expression in Mathematical 8.

$$\frac{1}{C[Rx(a, b)/Tx(d)]_0 + C[Rx(a-1, b)/Tx(d)]_0} - \qquad \text{[Mathematical 8]}$$

$$\frac{1}{C[Rx(a, b)/Tx(d)]_{zx} + C[Rx(a-1, b)/Tx(d)]_{zx}}$$

In addition, from above discussion, Δx is proportional to the following expression in Mathematical 9.

$$\frac{C[Rx(a, b)/Tx(d)]_{zx} - C[Rx(a-1, b)/Tx(d)]_{zx}}{C[Rx(a, b)/Tx(d)]_{zx} + C[Rx(a-1, b)/Tx(d)]_{zx}} \qquad \text{[Mathematical 9]}$$

As described above, the first electrodes Ty and the second electrodes Tx are arranged to form many intersections with the third electrodes Rx in a plan view, and hence by measuring mutual capacitances at the intersections, a contact position of a finger and its pressure can be detected. In other words, when the finger approaches the first electrode Ty and the second electrode Tx, the mutual capacitance at the intersection close to the contact position is changed, and further when the second insulator 13 is deformed by the pressure, the first electrode Ty and the second electrode Tx approach the third electrode pattern Rx, and hence the mutual capacitance at the intersection is changed.

For example, when a shear force in the Y direction acts at a certain point, in the portion of the first electrode Ty at which the shear force acts, areas of intersections with a pair of third electrodes Rx neighboring the first electrode Ty (overlapping portions of the first electrode Ty with a corresponding pair of the third electrodes Rx in a plan view) are changed. In this way, the capacitance between the first electrode Ty and one of the third electrodes Rx is increased, while the capacitance between the first electrode Ty and the other third electrode Rx is decreased.

(6) Control Structure of Touch Pad Device

With reference to FIG. 1, a control structure of the touch pad device 1 is described.

The control circuit 5 includes a microcontroller 25. The microcontroller 25 is a computer including a CPU, a RAM, a ROM, and the like.

The control circuit 5 includes a signal generation circuit 27. The signal generation circuit 27 is connected to the first electrode pattern Ty or the second electrode pattern Tx and to the microcontroller 25. The signal generation circuit 27 can apply a voltage pulse to the first electrode pattern Ty or the second electrode pattern Tx.

The control circuit 5 includes an analog-to-digital converter (ADC) 29. The ADC 29 is connected to the microcontroller 25 so that it can supply a digital signal.

The control circuit 5 includes an amplifier circuit 33. The amplifier circuit 33 is connected to the third electrode pattern Rx and the ADC 29. The amplifier circuit 33 amplifies an analog signal from the third electrode pattern Rx and sends it to the ADC 29.

The microcontroller 25 can detect mutual capacitances of overlapping portions (intersections) between the third electrode Rx and the first electrode pattern Ty as well as overlapping portions between the third electrode Rx and the second electrode pattern Tx. In other words, the microcontroller 25 has a function as a capacitance measuring circuit. Specifically, the microcontroller 25 can detect capacitance between the third electrode Rx and the first electrode Ty overlapping with the third electrode Rx in a plan view. The microcontroller 25 can detect capacitance between the third electrode Rx and the second electrode pattern Tx overlapping with the third electrode Rx in a plan view.

Further specifically, the microcontroller 25 controls the signal generation circuit 27 to sequentially apply the voltage pulse to the first electrode pattern Ty or the second electrode pattern Tx as a transmission electrode, and measures reception intensities of the plurality of third electrodes Rx as reception electrodes, so as to detect changes in mutual capacitances in the electrode intersections.

The control circuit 5 includes a gate driving circuit 35. The gate driving circuit 35 is a switching control unit that performs on-off control of a plurality of switching elements (described later) using a plurality of control lines (described later). The gate driving circuit 35 is connected to the microcontroller 25. The microcontroller 25 controls detection timing of capacitance and switching timing of the gate driving circuit 35.

The microcontroller 25 calculates a pressure acting position based on changes in mutual capacitances in the intersections. In other words, the microcontroller 25 has a function as a pressure-acting-position calculating circuit. A calculation technique of the pressure acting position is known, and hence description thereof is omitted.

The microcontroller 25 calculates the pressure based on the changes in the mutual capacitances in the intersections. In other words, the microcontroller 25 has a function as a pressure calculating circuit.

In this device, when a finger, for example, presses the protection layer 17, the microcontroller 25 sends the signal to the second electrode Tx or the first electrode Ty, and the signal received by the third electrode Rx is amplified by the amplifier circuit 33 and is received by the microcontroller 25 via the ADC 29, and thus the microcontroller 25 can measure the mutual capacitance between the third electrode Rx and the second electrode Tx or the first electrode Ty. Then, the microcontroller 25 calculates the pressure acting position and further calculates the pressure (the stress in the normal direction to the input surface and the shear stress).

Figure 12:
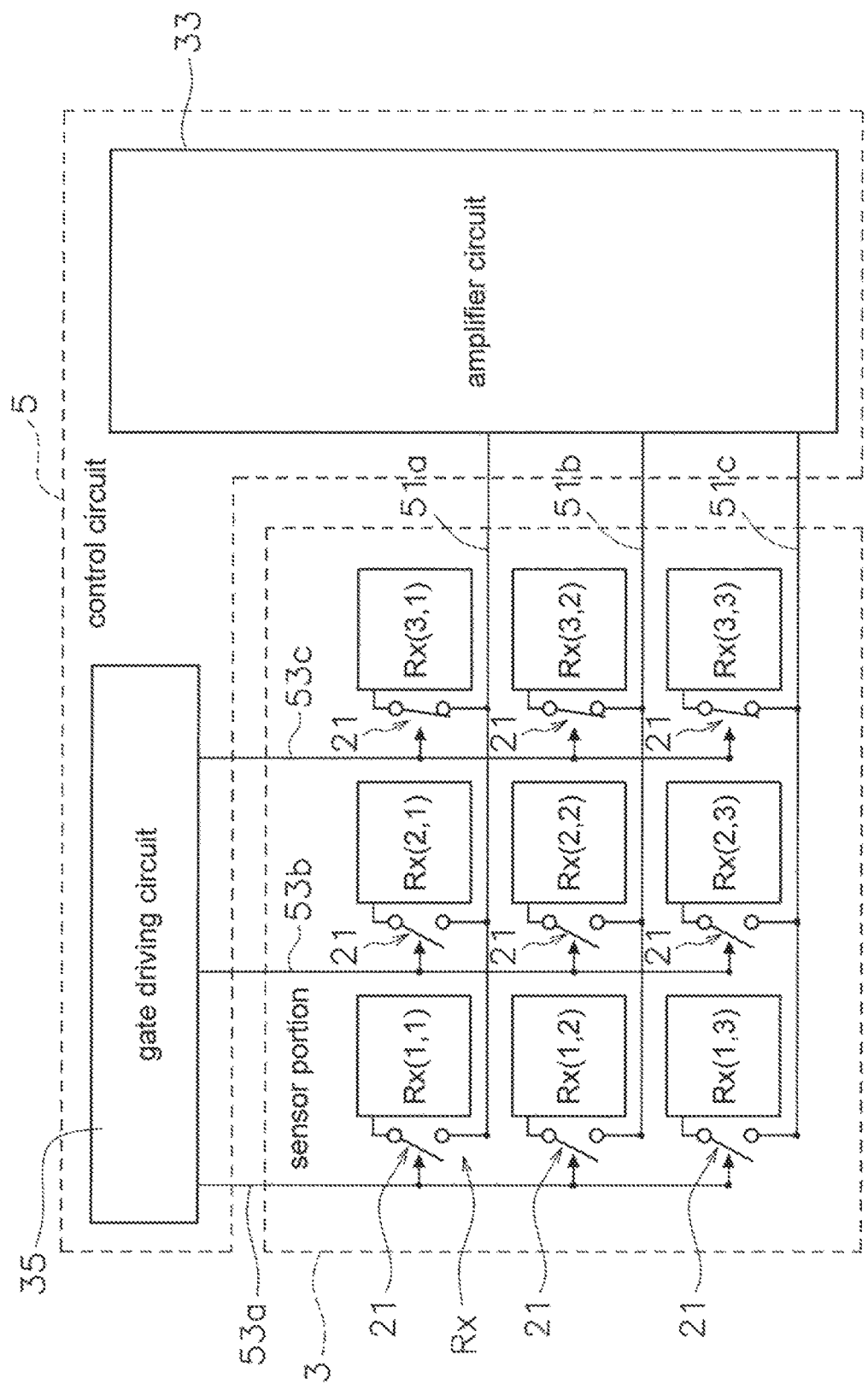
FIG. 12 is a schematic diagram showing an active matrix of the third electrode pattern.

With reference to FIG. 12, a switching circuit for the third electrodes Rx using an active matrix of switching elements 21 is described. FIG. 12 is a schematic diagram showing an active matrix of the third electrode pattern Rx. FIG. 12 shows a state where the switching element is attached to each of 9 (3×3) elements of the third electrodes Rx, as an example. Note that in reality the number of elements can be larger like 150 (10×15), but the description is made with reference to FIG. 12 for simple description. In this embodiment, the switching elements 21 are disposed on a second surface of the support substrate 11. The third electrode Rx and the switching element 21 are connected to each other with a connection line 23 formed in a through hole. Note that the switching elements can be disposed on the same surface as the third electrode Rx. The switching element 21 is, for example, a transistor such as an FET, a photocoupler, or the like. However, a type of the switching element 21 is not particularly limited.

The switching elements 21 are connected to the gate driving circuit 35 via control lines 53a to 53c in each column. The plurality of control lines 53a to 53c extend in the direction crossing the arrangement direction and are connected to a plurality of switching elements 21 arranged in that direction.

With the structure described above, the third electrode Rx is connected to an input of the amplifier circuit 33 (FIG. 12) via the switching elements 21 in the active matrix. Specifically, one terminal of the switching element 21 is connected to each of the third electrodes Rx, and the other terminal is connected to the amplifier circuit 33 via one of read lines 51a to 51c in each row. In other words, each of the plurality of read lines 51a to 51c are connected to a plurality of switching elements 21 arranged in one direction among the plurality of switching elements 21. In addition, each of the read lines 51a to 51c extends in the arrangement direction of those plurality of switching elements 21 and is connected to the amplifier circuit 33.

The gate driving circuit 35 (one example of the switching control unit) is used for utilizing a method of selectively connecting the third electrodes Rx to the control circuit 5 by the switching element 21, i.e., utilizing so-called active matrix detection. The gate driving circuit 35 switches on and off of the switching elements 21 using the plurality of control lines 53a to 53c according to an instruction from the microcontroller 25.

The gate driving circuit 35 can turn on only the switching elements 21 of an arbitrary column, so that the third electrodes Rx of the column can be individually connected to the amplifier circuit 33. FIG. 12 shows a state where switching elements 21 connected to the third electrodes Rx(3, 1) to Rx(3, 3) are turned on by the gate driving circuit 35. In this case, only the third electrodes Rx(3, 1) to Rx(3, 3) are individually connected to the amplifier circuit 33, and other third electrodes Rx, whose switching elements 21 are turned off, are not connected to the amplifier circuit 33.

With the structure described above, in the state where the gate driving circuit 35 turns on the plurality of switching elements 21 via one control line, the microcontroller 25 detects the plurality of read lines 51a to 51c in turn, so as to detect a change in capacitance at intersection between the third electrode pattern Rx and the first electrode pattern Ty or the second electrode pattern Tx. In other words, because the read lines 51a to 51c are connected to the plurality of third electrodes Rx via the plurality of switching elements 21, the number of read lines can be reduced. As a result, in a structure where many third electrodes Rx are arranged, the read lines can be arranged with no problem.

As a comparison example, in a case where, without adopting the structure described above, all the third electrodes Rx are individually wired to the amplifier circuit (hereinafter referred to as "all wired"), the number of the wiring lines becomes too large, and such a structure is considered to be unrealistic. In a case where the third electrodes constitute a matrix of 4×4 or more, the number of wiring lines to the control circuit in the active matrix of this embodiment becomes one half or less compared with the case of "all wired", and thus the active matrix is effective.

(7) Detection Control of Pressure Acting Position and Pressure

Figure 13:
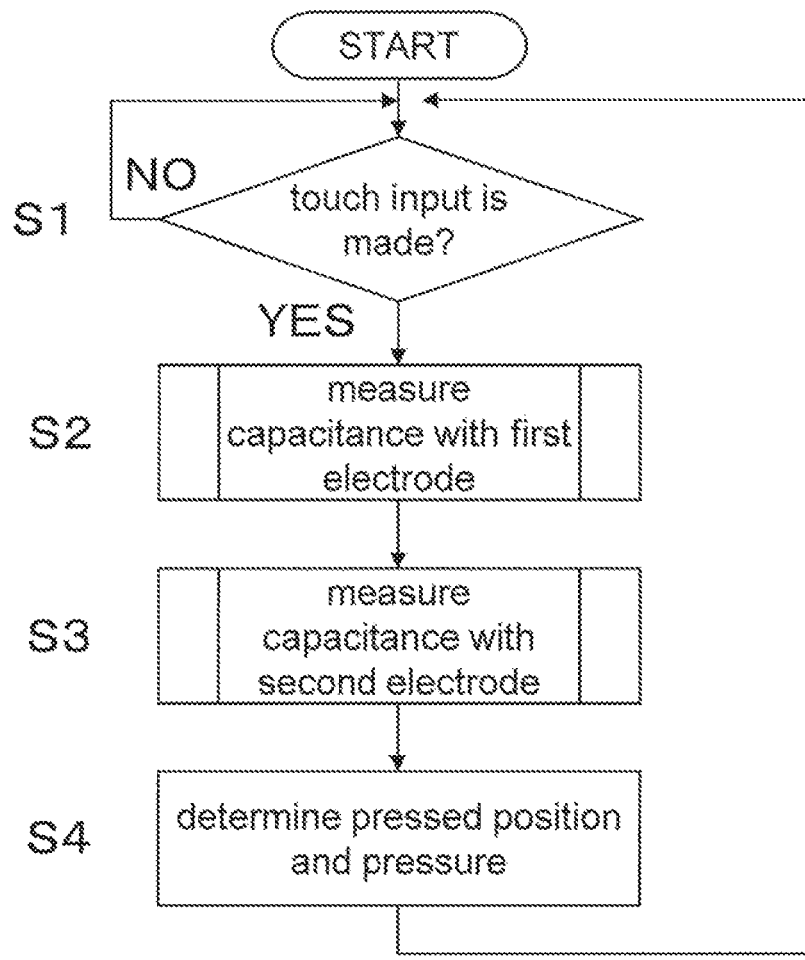
FIG. 13 is a control flowchart of pressure measurement.

With reference to FIG. 13, control operation by the microcontroller 25 of touch detection of the touch pad device 1 is described. FIG. 13 is a control flowchart of pressure measurement.

First, the microcontroller 25 determines whether or not a touch input is made based on a level signal from the amplifier circuit 33 (Step S1).

When it is determined that a touch input is made (Yes in Step S1), the microcontroller 25 measures capacitance at the intersection between the first electrode pattern Ty and the third electrode pattern Rx (Step S2).

The microcontroller 25 measures capacitance at the intersection between the second electrode pattern Tx and the third electrode pattern Rx (Step S3).

Capacitance values at the intersections are stored in a memory of the microcontroller 25.

The order of Step S2 and Step S3 is not limited to the above example.

Next, the microcontroller 25 determines a pressure acting position and a pressure of the touch (Step S4).

Figure 14:
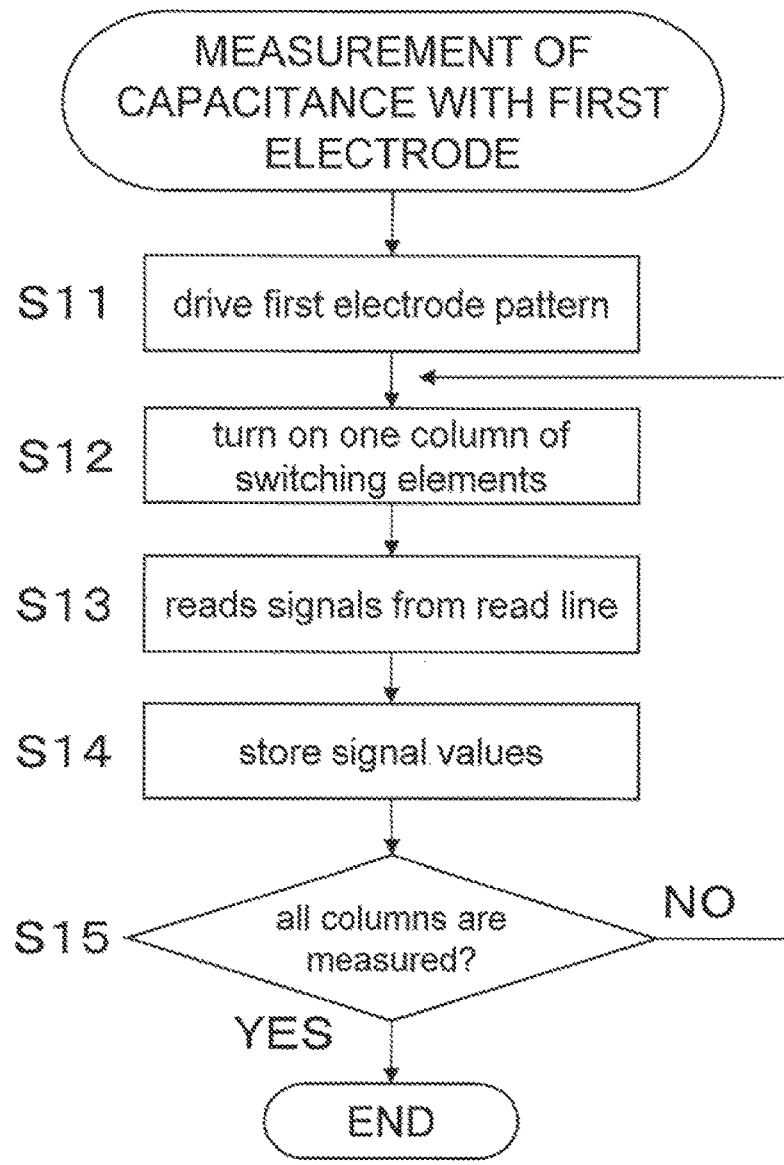
FIG. 14 is a control flowchart of measurement of capacitance between the first electrode pattern and the third electrode pattern.

With reference to FIG. 14, measurement control of capacitance at each intersection in Step S2 is described. FIG. 14 is a flowchart of measurement control of capacitance between the first electrode pattern Ty and the third electrode pattern Rx.

First, the microcontroller 25 supplies a drive voltage to the first electrode pattern Ty (Step S11).

Next, the gate driving circuit 35 turns on one column of the switching elements 21 (Step S12).

The microcontroller 25 sequentially reads the signals from the third electrodes Rx via the read line (Step S13).

The read values are stored in the memory (Step S14).

Next, it is determined whether or not the measurement is completed for all columns (Step S15). If there is an unmeasured column (No in Step S15), the process returns to Step S12. When the mutual capacitances at the intersections of all columns are measured (Yes in Step S15), the process is finished.

Figure 15:
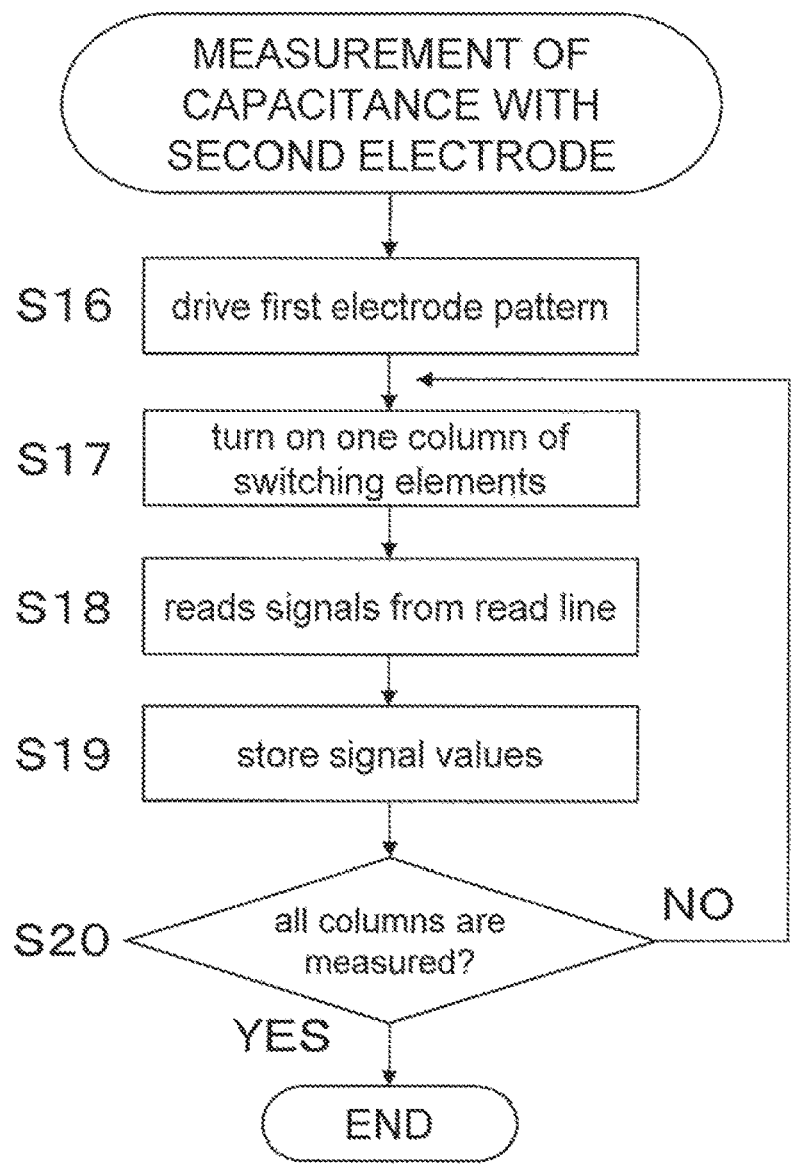
FIG. 15 is a control flowchart of measurement of capacitance between the second electrode pattern and the third electrode pattern.

With reference to FIG. 15, measurement control of the capacitance values at the intersections in Step S3 is described. FIG. 15 is a flowchart of measurement control of the capacitance between the second electrode pattern and the third electrode pattern.

First, the microcontroller 25 supplies the drive voltage to the first electrode pattern Ty (Step S16).

Next, the gate driving circuit 35 turns on one column of the switching elements 21 (Step S17).

The microcontroller 25 sequentially reads the signals from the third electrodes Rx via the read line (Step S18).

The read values are stored in the memory (Step S19).

Next, it is determined whether or not the measurement is completed for all columns (Step S20). If there is an unmeasured column (No in Step S20), the process returns to Step S17. When the mutual capacitances at the intersections of all columns are measured (Yes in Step S20), the process is finished.

As a result of the above process, all the in-plane distributions of the stress in the X, Y, and Z directions applied to the sheet-like elastic body can be detected. As an application example of the device described above, when a plurality of fingers touch, forces of the fingers in the X, Y, and Z directions can be detected. If the disclosure is applied to an input device such as a touch pad of a PC, stress in a rotational direction can also be detected in a pseudo manner, and hence novel gestures such as "pinch" and "surface twist" can be detected. In addition, it can be a novel input device for operating a 3D image.

There is an application example of this sensor, which measures a body pressure distribution. For example, in the case of measuring a pressure distribution on a foot sole for measurement of walking or running, it is desired to measure a shear force. In addition, when laying the sensor on a bed, it can measure a shear force distribution of the entire body of a lying person, and hence it can contribute to studying or prevention of bed sores.

2. Other Embodiments

Although one or more embodiments of the present disclosure are described above, the present disclosure is not limited to the embodiments described above but can be variously modified within the scope of the disclosure without deviating from the spirit thereof. In particular, the embodiments and variations described in this specification can be arbitrarily combined as necessary.

The lamination order of the layers and presence or absence of other layers are not limited to the embodiments described above.

The materials and thicknesses of the layers are not limited to the embodiments described above.

The control structure is not limited to the embodiments described above.

The control flowchart is not limited to the embodiments described above. Specifically, the order of the steps and presence or absence of a step are not particularly limited. In particular, all or a part of the steps described as sequential can be performed at the same time.

It is possible to measure capacitance between the fourth electrode pattern Ta and the third electrode pattern Rx.

It is possible to measure capacitance of the fourth electrode pattern Ta so that a weak pressure can be measured.

While only selected embodiments have been chosen to illustrate the present advancement, it will be apparent to those skilled in the art from this disclosure that various changes and modifications can be made herein without departing from the scope of the disclosure as defined in the appended claims. Furthermore, the foregoing descriptions of the embodiments according to the present disclosure are provided as examples only, and not for the purpose of limiting the disclosure as defined by the appended claims and their equivalents. Thus, the scope of the disclosure is not limited to the disclosed embodiments.

What is claimed is:

1. A pressure detecting device comprising:
a support substrate,
a second insulator having a lower stiffness than the support substrate so as to be elastically deformed by a pressure,
a first insulator, the support substrate, the second insulator, and the first insulator laminated in order from a side opposite to a pressure input side;
a plurality of land-like electrodes arranged to cover an entire surface between the second insulator and the support substrate;
a plurality of first belt-like electrodes extending in a first direction on a side of the first insulator opposite to the second insulator, each of the first belt-like electrodes extending along spaces between, among the plurality of land-like electrodes, land-like electrodes neighboring in a direction crossing the first direction so as to overlap only partly with each of the neighboring land-like electrodes in a plan view;
a plurality of second belt-like electrodes extending in a second direction crossing the first direction between the first insulator and the second insulator, each of the second belt-like electrodes extending along spaces between, among the plurality of land-like electrodes, land-like electrodes neighboring in a direction crossing the second direction so as to overlap only partly with each of the neighboring land-like electrodes in a plan view;
a capacitance measuring circuit configured to detect capacitance generated between each of the land-like electrodes and the corresponding first belt-like electrode overlapping each of the land-like electrodes in a plan view, and configured to detect capacitance generated between each of the land-like electrodes and the corresponding second belt-like electrode overlapping the land-like electrodes in a plan view; and a pressure calculating circuit configured to calculate shear force based on capacitance measurement results detected by the capacitance measuring circuit, due to a change in an overlapping surface area between the land-like electrodes and the corresponding first belt-like electrode overlapping each other in a plan view and/or an overlapping surface area between the land-like electrodes and the corresponding second belt-like electrode overlapping each other in a plan view, when a pressure is applied so that the second insulator is deformed.

2. The pressure detecting device according to claim 1, further comprising:
- a plurality of switching elements connected to the plurality of electrodes, respectively;
- a plurality of read lines connected to a plurality of switching elements arranged in the first direction or the second direction among the plurality of switching elements, the plurality of read lines extending in an arrangement direction of the plurality of switching elements so as to be connected to the capacitance measuring circuit;
- a plurality of control lines extending in a direction crossing the arrangement direction so as to be connected to the plurality of switching elements arranged in the direction crossing the arrangement direction; and
- a switching control unit configured to perform on-off control of the plurality of switching elements via the plurality of control lines.

3. The pressure detecting device according to claim 2, wherein an elastic modulus of the second insulator is 0.001 to 10 MPa.

4. The pressure detecting device according to claim 3, wherein an elastic modulus of the second insulator is 0.001 to 0.01 MPa.

5. The pressure detecting device according to claim 2, wherein the first insulator is thinner than the second insulator.

6. The pressure detecting device according to claim 1, wherein an elastic modulus of the second insulator is 0.001 to 10 MPa.

7. The pressure detecting device according to claim 6, wherein an elastic modulus of the second insulator is 0.001 to 0.01 MPa.

8. The pressure detecting device according to claim 7, wherein the first insulator is thinner than the second insulator.

9. The pressure detecting device according to claim 6, wherein the first insulator is thinner than the second insulator.

10. The pressure detecting device according to claim 1, wherein the first insulator is thinner than the second insulator.

11. The pressure detecting device according to claim 1, wherein the land-like electrodes are arranged in a matrix.

* * * * *